(12) United States Patent
Jia et al.

(10) Patent No.: US 9,454,792 B2
(45) Date of Patent: Sep. 27, 2016

(54) DEVICE, SYSTEM AND METHOD FOR TRANSFERRING NETWORK DATA

(71) Applicant: NVIDIA CORPORATION, Santa Clara, CA (US)

(72) Inventors: Zhen Jia, Guangdong (CN); Shu Zhang, Zhuzhou (CN); Jun Qiu, Guangzhou (CN)

(73) Assignee: NVIDIA Corporation, Santa Clara, CA (US)

( * ) Notice: Subject to any disclaimer, the term of this patent is extended or adjusted under 35 U.S.C. 154(b) by 335 days.

(21) Appl. No.: 13/870,011

(22) Filed: Apr. 25, 2013

(65) Prior Publication Data

US 2014/0218379 A1 Aug. 7, 2014

(30) Foreign Application Priority Data

Feb. 7, 2013 (CN) .......................... 2013 1 0049967

(51) Int. Cl.
*G06T 1/20* (2006.01)

(52) U.S. Cl.
CPC ...................... *G06T 1/20* (2013.01)

(58) Field of Classification Search
None
See application file for complete search history.

(56) References Cited

U.S. PATENT DOCUMENTS

| | | | | |
|---|---|---|---|---|
| 2006/0022973 A1* | 2/2006 | Alcorn | ................... | G06F 3/1454 345/419 |
| 2006/0164328 A1* | 7/2006 | Jaff | .................. | G09G 5/006 345/2.3 |
| 2006/0209077 A1* | 9/2006 | Walls | .................. | G06F 3/1438 345/504 |
| 2006/0253802 A1* | 11/2006 | Kim | .................. | G06F 3/04815 715/836 |
| 2008/0001957 A1* | 1/2008 | Hancock | .................. | G06F 3/14 345/530 |
| 2009/0091656 A1* | 4/2009 | Kitaru | .................. | G09G 5/003 348/554 |
| 2010/0007646 A1* | 1/2010 | Tsuei | .................. | G06F 1/3203 345/212 |
| 2010/0182402 A1 | 7/2010 | Nakajima et al. | | |
| 2011/0317587 A1* | 12/2011 | Lida | .................. | H04L 12/2832 370/254 |
| 2012/0249871 A1* | 10/2012 | Nguyen | ................ | H04B 10/40 348/441 |
| 2012/0287942 A1 | 11/2012 | Peng et al. | | |

FOREIGN PATENT DOCUMENTS

| | | |
|---|---|---|
| TW | 200428263 A | 12/2004 |
| TW | 200428826 A | 12/2004 |

(Continued)

OTHER PUBLICATIONS

HDTV Supply,"DVI to CAT5 Extender Set", https://web.archive.org/web/20120120051229/http://www.hdtvsupply.com/dvi-to-cat5-extender.html.*

(Continued)

*Primary Examiner* — Phi Hoang
(74) *Attorney, Agent, or Firm* — Artegis Law Group, LLP

(57) ABSTRACT

A device, system and method for transferring network data are presented. The device includes: a data processing module configured to convert a data signal in a TMDS signal output via a DVI of a graphics card to network data for being transferred via a network; and a network transmitter for receiving the network data and transferring the network data to an external device via the network. The data signal is generated by encoding texture data generated by a GPU of the graphics card by a digital video sender of the graphics card. The texture data is generated by binding a pointer to general computing data stored in a device memory of the graphics card to a texture stored in the device memory by the GPU. The general computing data is generated by general computation executed by the GPU.

25 Claims, 3 Drawing Sheets

(56) References Cited

FOREIGN PATENT DOCUMENTS

| | | |
|---|---|---|
| TW | 200638636 A | 11/2006 |
| TW | 200905549 A | 2/2009 |

OTHER PUBLICATIONS

High-Definition Multimedia Interface Specification Version 1.1, 2004, Section 4.2.7.

* cited by examiner

DEVICE, SYSTEM AND METHOD FOR TRANSFERRING NETWORK DATA

CROSS-REFERENCE TO RELATED APPLICATIONS

This application claims priority to Chinese Patent Application No. 201310049967.4, filed on Feb. 7, 2013, which is hereby incorporated by reference.

BACKGROUND OF THE INVENTION

Field of Invention

The present invention relates generally to the field of communication, and more particularly to a device, system and method for transferring network data.

Graphics card, which is one of the most basic components of a personal computer, takes on the task of outputting graphics for being displayed. Graphics processing unit (GPU), the core of a graphics card, substantially decides performance of the graphics card. Initially, GPU is mainly used for rendering graphics, however, with the development of programmable ability and performance of GPU, it is no longer limited to graphics processing but begins to enter the field of high-performance computing (HPC).

When GPU is used for general computation, it is usually needed that data processed by the GPU is transferred to a remote external device via a network for being further processed. A current method for transferring such network data includes the following steps. Initially, original data is computed by the GPU and then the computed result data is stored in a video memory. Central Processing Unit (CPU) copies the computed result data in the video memory to an internal memory of a computer system. The CPU transfers the computed result data to a remote external device via a network based on a communications protocol. During the above transferring process, memory resources and CPU resources of the computer system may be wasted and the delay in the transferring process may be increased. In addition, a PCIE bus is needed for the transferring and the bandwidth of the PCIE bus is limited. Thus, the demands of device with larger bandwidth for some applications, such as video stream processing application, digital modulation, software radio, radar system, computed tomography and ultrasonic imaging, etc., cannot be satisfied. Meantime, because the delay of the PCIE bus is not fixed, the input and the output of data in the video memory cannot be synchronized, affecting directly the speed of processing general computing data of the GPU.

SUMMARY OF THE INVENTION

Accordingly, there is a need in the art for technology capable of decreasing the delay in the transferring process of network data and saving computer system resources.

In one embodiment, a device for transferring network data is disclosed. The device includes a data processing module configured to convert a data signal in a TMDS (transition minimized differential signaling) signal output via a digital video interface (DVI) of a graphics card to network data for being transferred via a network. The device also includes a network transmitter for receiving the network data and transferring the network data to an external device via the network. The data signal is generated by encoding texture data generated by a GPU of the graphics card by a digital video sender of the graphics card. The texture data is generated by binding a pointer to general computing data stored in a device memory of the graphics card to a texture stored in the device memory by the GPU. The general computing data is generated by general computation executed by the GPU.

Preferably, a network data transfer operation of the device is controlled by a control signal in the TMDS signal.

Preferably, the device is powered at least partially by a power signal in the TMDS signal.

Preferably, the device further includes a power interface, via which an external power source provides additional electric energy to the device.

Preferably, the data processing module includes a digital video receiver configured to decode the data signal to parallel data and a data converter configured to convert the parallel data to the network data according to a communications protocol.

Preferably, the network transmitter is a wired network transmitter for transferring the network data to the external device via a wired connection.

Preferably, the network transmitter is a wireless network transmitter for transferring the network data to the external device wirelessly.

Preferably, the network transmitter includes a wired network transmitter and a wireless network transmitter, and the data processing module is further configured to control the network data to be transferred to the external device via the wired network transmitter or the wireless network transmitter.

Preferably, the data processing module includes an encryption module configured to encrypt the network data before the network data is received by the network transmitter.

Preferably, the data processing module includes an extended display identification data memory (EDID ROM) for storing virtual display information, so that the graphics card reads the virtual display information via the DVI and determines a transfer parameter of the TMDS signal according to the virtual display information.

In another embodiment, a system for transferring network data is presented. The system includes one or more subsystems for transferring network data, each of which includes a graphics card and a device for transferring network data. The graphics card includes a device memory for storing general computing data and a texture. The graphics card also includes a GPU configured to execute general computation to generate the general computing data and bind a pointer to the general computing data to the texture to generate texture data. The graphics card also includes a digital video sender for encoding the texture data to generate a data signal in a TMDS signal and outputting the TMDS signal to the device via a DVI of the graphics card. The device includes a data processing module configured to convert the data signal to network data for being transferred via a network. The device also includes a network transmitter for receiving the network data and transferring the network data to an external device via the network.

Preferably, the TMDS signal includes a control signal to control a network data transfer operation of the device.

Preferably, the TMDS signal includes a power signal, which is transferred to the device via the DVI for powering the device at least partially.

Preferably, the device further includes a power interface, via which an external power source provides additional electric energy to the device.

Preferably, the data processing module includes a digital video receiver configured to decode the data signal to parallel data and a data converter configured to convert the parallel data to the network data according to a communications protocol.

Preferably, the network transmitter is a wired network transmitter for transferring the network data to the external device via a wired connection.

Preferably, the network transmitter is a wireless network transmitter for transferring the network data to the external device wirelessly.

Preferably, the network transmitter includes a wired network transmitter and a wireless network transmitter, and the data processing module is further configured to control the network data to be transferred to the external device via the wired network transmitter or the wireless network transmitter.

Preferably, the data signal includes a vertical synchronizing (VSYNC) signal to control processing speed of the GPU.

Finally, in a different embodiment, a method for transferring network data is disclosed. The method includes: executing general computation to generate general computing data and binding a pointer to the general computing data to a texture to generate texture data by a GPU of a graphics card, wherein the general computing data and the texture are stored in a device memory of the graphics card; encoding the texture data to generate a data signal in a TMDS signal and outputting the TMDS signal to a device for transferring network data via a DVI of the graphics card by a digital video sender of the graphics card; converting the data signal to network data for being transferred via a network by a data processing module of the device; and receiving the network data and transferring the network data to an external device via the network by a network transmitter of the device.

The technology provided by the present invention can decrease the delay during transferring general computing data of a GPU to an external device via a network, save computer system resources and satisfy the demands of an external device with large bandwidth.

Advantages and features of the present invention will be described in detail below in connection with the accompanying drawings.

BRIEF DESCRIPTION OF THE DRAWINGS

In order that the advantages of the invention will be readily understood, a more detailed description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

In the following discussion, details are presented so as to provide a more thorough understanding of the present invention. However, the present invention may be implemented without one or more of these details as would be apparent to one of ordinary skill in the art. Certain examples are illustrated without elaborate discussion of technical features that would be within the purview of one of ordinary skill in the art so as to avoid confusion with the present invention.

Figure 1:
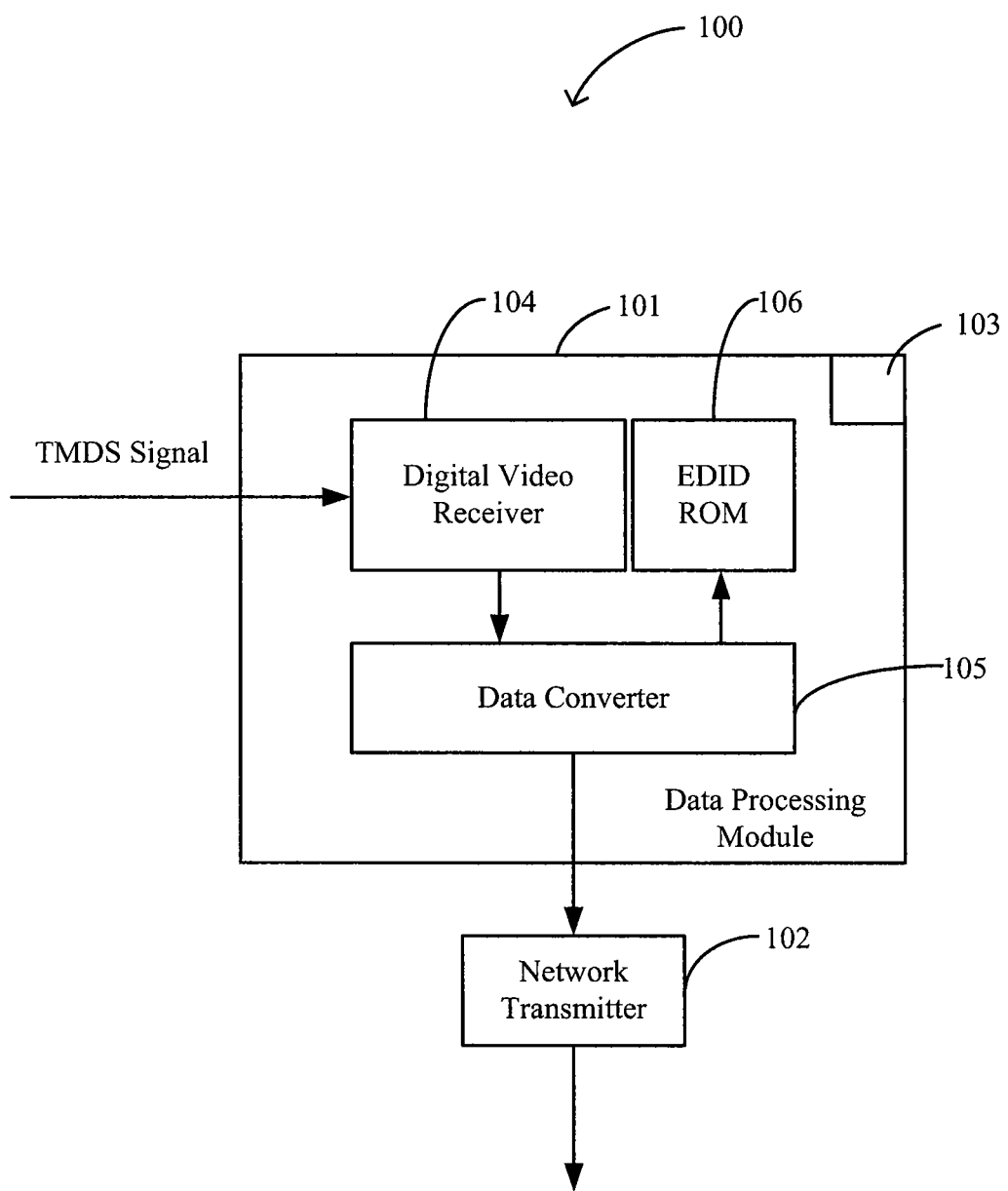
FIG. 1 illustrates a schematic block diagram of a device for transferring network data, according to an embodiment of the present invention.

The present invention discloses a device for transferring network data. FIG. 1 illustrates a schematic block diagram of a device 100 for transferring network data, according to an embodiment of the present invention. The device 100 includes a data processing module 101 and a network transmitter 102. The data processing module 101 is configured to convert a data signal in a TMDS signal output via a DVI of a graphics card to network data for being transferred via a network. For example, parallel data is packaged into frames, i.e. network data, according to TCP/IP. Then the data processing module 101 transfers the network data to the network transmitter 102. The network transmitter 102 is used for receiving the network data and transferring the network data to an external device via the network. The above data signal in the TMDS signal is obtained from general computing data generated by general computation executed by a GPU of the graphics card. Texture data is generated by binding a pointer to the general computing data stored in a device memory of the graphics card to a texture stored in the device memory by the GPU of the graphics card. Then the data signal is generated by encoding the texture data generated by the GPU of the graphics card by a digital video sender of the graphics card. More specifically, the GPU executes the general computation on original data to be processed to obtain the general computing data and stores the general computing data in the device memory of the graphics card, i.e. video memory. Then the GPU creates a texture through Application Program Interface (API), e.g. openGL, in the device memory. "Texture" is a bitmap which stores surface material color, and the image rendered by the texture can be displayed on a display apparatus. What is usually bound to a texture is image data in prior art. According to an embodiment of the present invention, the image data is replaced with the general computing data and the general computing data is bound to the texture. Specifically, the GPU binds a pointer to the general computing data to the texture to generate the texture data. That is, the texture data refers to the bound general computing data. Then the digital video sender of the graphics card encodes the texture data into a TMDS signal and outputs the TMDS signal to the data processing module 101 via the DVI. In a preferable embodiment, the data processing module 101 and the network transmitter 102 are integrated into a module, which is beneficial for unified design and industrialization of the module.

The data signal output from the graphics card may be transformed by the data processing module 101 and the network transmitter 102 to be transferred to an external device via the network finally. The external device may be, for example, Internet Protocol Television (IPTV), compute nodes, Personal Computer (PC), Phone or Mobile Internet Device (MID), etc. The external device may support security/throughout management and support web server/broadcast. Transferring a data signal of a graphics card by the device 100 may save computer system resources, obtain low latency and high speed, and may satisfy the demands for transferring a large amount of data.

Alternatively, a network data transfer operation of the device 100 may be controlled by a control signal in the TMDS signal. The TMDS signal output via the DVI of the graphics card may contain a control signal, which may control the data processing module 101 and the network transmitter 102 to execute corresponding operations. In an embodiment, the control signal may control the data processing module 101 and the network transmitter 102 to transfer the network data to a particular external device. The control signal may contain address information of a target device. The data processing module 101 may convert the address information to a hardware address of the target device, and then indicate the network transmitter 102 to transfer the network data to the target device according to the hardware address. In a word, the control signal may enable the device 100 to transfer the network data as needed.

Alternatively, the device 100 may be powered at least partially by a power signal in the TMDS signal. In an embodiment, the DVI may include power pins and the TMDS signal may contain a power signal that is output to the device 100 via the power pins. The power signal may power the data processing module 101 and the network transmitter 102. In an embodiment, the voltage value of the power signal may be 5V. The device 100 may be powered conveniently and efficiently by using the power signal output by the graphics card.

Alternatively, the device 100 may further include a power interface 103, via which an external power source provides additional electric energy to the device 100. Alternatively, the eternal power source may be a separate power source or a power source being used by the graphics card. Additional electric energy may be provided to the device 100 by using the external power source in order to avoid that the device 100 cannot operate properly when electric energy provided by the graphics card is insufficient.

Alternatively, the data processing module 101 may include a digital video receiver 104 and a data converter 105. The digital video receiver 104 is configured to decode the data signal in the TMDS signal from the graphics card to parallel data. The data converter 105 is configured to convert the parallel data to the network data according to a communications protocol. The communications protocol may be any communications protocol known in the art, e.g. TCP/IP, NetBEUI, WAPI, etc. Preferably, the communications protocol is TCP/IP, which has a wide range of application, short response time for transferring data, less protocol interaction and is suitable for high-speed transfer. The digital video receiver 104 may include one or more decoders that may decode the data signal in the TMDS signal from the graphics card. The data converter 105 may control and manage the data transfer operation of the network transmitter 102. For example, the data converter 105 may control the network transmitter 102 to transfer data to a particular target device. Alternatively, the digital video receiver 104 and the data converter 105 may be integrated into a module or be provided independently and respectively. Space and resources may be saved by integrating the digital video receiver 104 and the data converter 105 into a module. Detection and replacement of the module may benefit from providing the digital video receiver 104 and the data converter 105 independently and respectively. The data converter 105 may be implemented as any programmable device known in the art, for example, Application Specific Integrated Circuit (ASIC), Field Programmable Gate Array (FPGA), Complex Programmable Logic Device (CPLD), etc. Preferably, the data converter 105 is implemented as FPGA, which has low power consumption and flexible usage and may be used repeatedly. When the digital video receiver 104 and the data converter 105 are integrated into a module, the module may be implemented as any programmable device known in the art, for example, ASIC, FPGA, CPLD, etc., and preferably FPGA.

Alternatively, the data processing module 101 may also include an encryption module (not shown) configured to encrypt the network data before the network data is received by the network transmitter 102. The encryption module may be programmed to encrypt the network data with a particular encryption algorithm to avoid the network data from being illegal intercepted and stolen when it is being transferred via the network, thus the security of useful information or private information contained in the network data may be guaranteed.

Alternatively, the data processing module 101 may also include an EDID ROM 106 for storing virtual display information, so that the graphics card reads the virtual display information via the DVI and determines a transfer parameter of the TMDS signal according to the virtual display information. In an embodiment, the virtual display information may include resolution and refresh rate. The GPU of the graphics card may access the EDID ROM 106 through a display data channel (DDC) in the DVI to read the resolution and the refresh rate stored in the EDID ROM 106. The GPU regards the device 100 as a "display apparatus" after reading the resolution and the refresh rate. Then the graphics card may output data to the device 100. In addition, the GPU may determine a transfer parameter of the TMDS signal according to the resolution and the refresh rate. The transfer parameter may include "frame size" and "transmission speed" of the TMDS signal. The GPU may control the frame size and the transmission speed of the TMDS signal to match them with the resolution and the refresh rate. In an embodiment, the virtual display information stored in the EDID ROM 106 may be rewrote by the data converter 105, so the "frame size" and the "transmission speed" of the TMDS signal may be modified conveniently. In an embodiment, the EDID ROM 106 may be integrated in the data converter 105, which is beneficial for saving space and cost.

Alternatively, the network transmitter 102 may be a wired network transmitter for transferring the network data to the external device via a wired connection. In an embodiment, the network transmitter 102 may encode the network data and convert the encoded network data to an analog signal for being transferred to the external device via a wired medium. The encoding mode of the network transmitter 102 may be, for example, Manchester encoding. The wired medium may employ any wired network transfer medium, for example twisted pair, optical fiber and coaxial cable, etc. The network transmitter 102 may also include a network interface for transferring the network data to the wired medium. The network interface may be, for example, RJ-45 interface, BNC interface, AUI interface, FDDI interface, etc. The wired network transmitter may make the transfer of the network data be more reliable and more stable.

Alternatively, the network transmitter 102 may be a wireless network transmitter for transferring the network data to the external device wirelessly. In an embodiment, the network transmitter 102 may encode the network data, covert the encoded network data to a radio signal and transmit the radio signal to the external device. The wireless network transmitter may make the system including the device 100 have good extensibility and be easy to maintain.

Alternatively, the network transmitter 102 may include a wired network transmitter and a wireless network transmitter. The data processing module 101 may be further configured to control the network data to be transferred to the external device via the wired network transmitter or the wireless network transmitter. In an embodiment, the data processing module 101 may be programmed to select a transfer mode and a transfer path of the network data. Thus the device 100 may be used in different network environments conveniently and has a wide range of application.

Persons of ordinary skill in the art can understand that the above device 100 for transferring network data may be constructed to be an approximate cuboid. It may be provided with a DVI, for example, single-link DVI, dual-link DVI, two dual-link DVI and so on. Preferably, the device 100 is also provided with an antenna for transferring via a wireless network.

Figure 2:
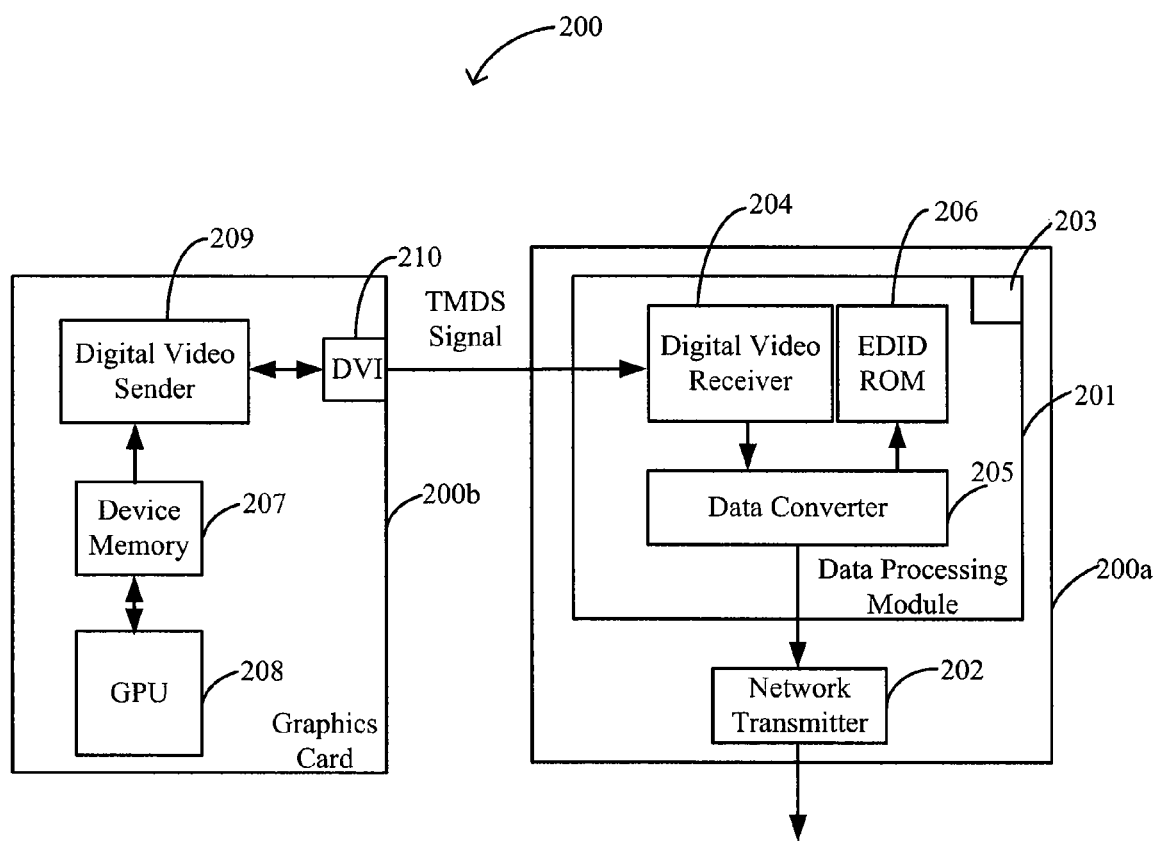
FIG. 2 illustrates a schematic block diagram of a subsystem for transferring network data, according to an embodiment of the present invention.

According to another aspect of the present invention, a system for transferring network data is also disclosed. The system includes one or more subsystems for transferring network data. FIG. 2 illustrates a schematic block diagram of a subsystem 200 for transferring network data, according to an embodiment of the present invention. As shown, the subsystem 200 includes a graphics card 200b and a device 200a for transferring network data. The graphics card 200b includes a device memory 207, a GPU 208, a digital video sender 209 and a DVI 210. The device memory 207 is used for storing general computing data and a texture. The GPU 208 is configured to execute general computation to generate the general computing data and bind a pointer to the general computing data to the texture to generate texture data. The digital video sender 209 is used for encoding the texture data to generate a data signal in a TMDS signal and outputting the TMDS signal to the device 200a via the DVI 210. The device 200a includes a data processing module 201 and a network transmitter 202. The data processing module 201 is configured to convert the data signal to network data for being transferred via a network. The network transmitter 202 is used for receiving the network data and transferring the network data to an external device via the network. In an embodiment, the system for transferring network data includes a plurality of subsystems 200. Different subsystems may transfer general computing data processed by their respective GPUs 200b to the same external device through their respective devices 200a. The general computing data from different subsystems may be further processed, e.g. analyzed, gathered, etc., by the external device, thereby realizing distributed computation. Therefore, the above system has very powerful data processing ability and computing ability.

Alternatively, the TMDS signal may also include a control signal to control a network data transfer operation of the device 202a.

Alternatively, the TMDS signal may also include a power signal, which is transferred to the device 202a via the DVI 210 for powering the device 202a at least partially.

Alternatively, the data signal in the TMDS signal may also include a VSYNC signal to control processing speed of the GPU 208. In an embodiment, during one VSYNC period, the GPU 208 processes one frame of data and output it via the DVI 210. Then the GPU 208 begins to process the next frame of data. Because the processing speed of the GPU 208 is far faster than the data output speed of the DVI 210, it is may be avoided by using the VSYNC signal that the processing speed of the GPU 208 and the data output speed of the DVI 210 are nonsynchronous. Thereby data loss may be avoided.

Alternatively, the DVI 210 may be single-link DVI, dual-link DVI or two dual-link DVI, etc. Using multi-link DVI may better satisfy the demands for transferring a large amount of data. The DVI may be, for example, DVI-A, DVI-I and DVI-D, etc.

The data processing module and the network transmitter involved in the above system for transferring network data have been described in the description about embodiments of the device for transferring network data. For brevity, a detailed description thereof is omitted. Those skilled in the art can understand that specific structure and operation mode thereof with reference to FIG. 1 and FIG. 2 in combination with the above description.

Figure 3:
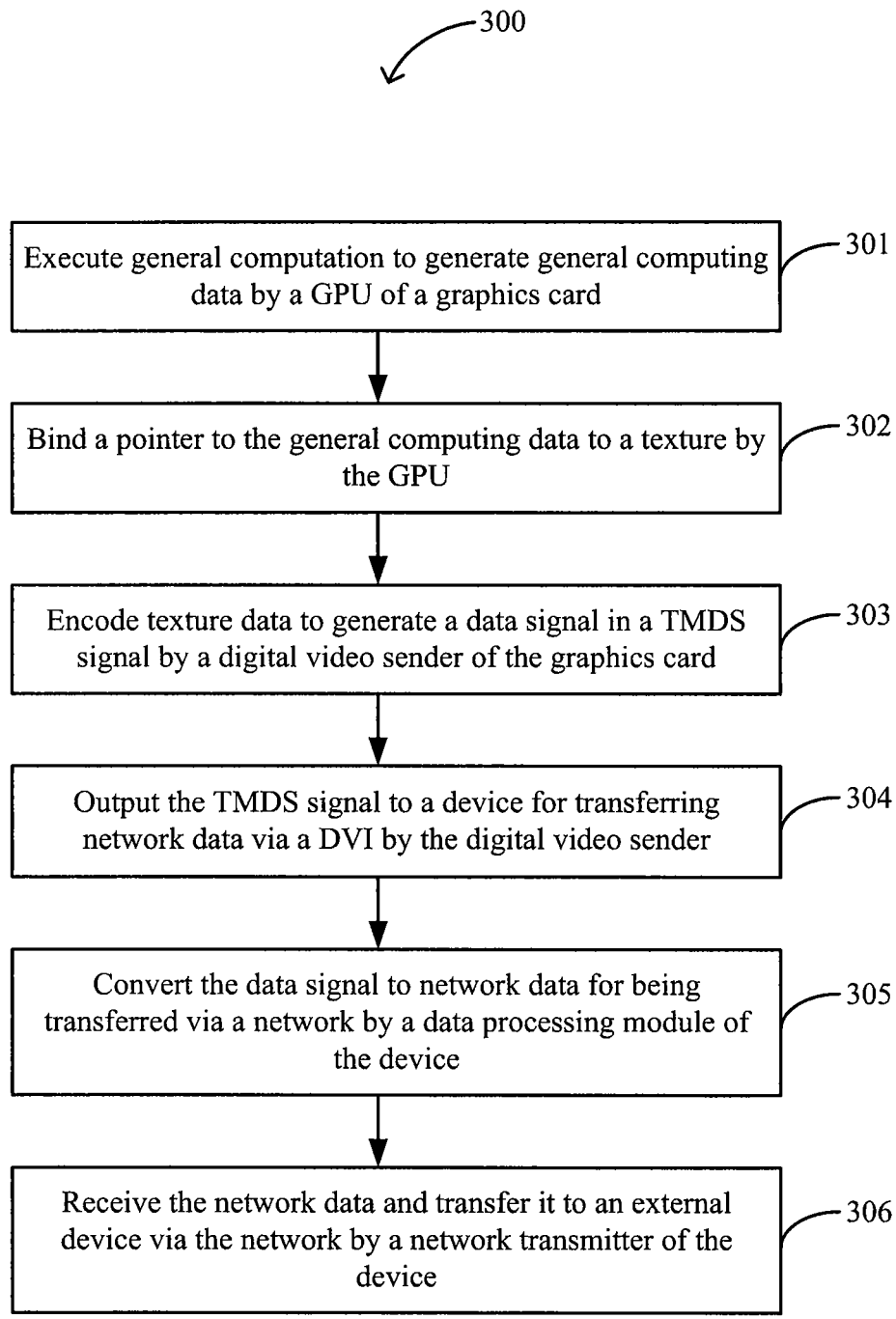
FIG. 3 illustrates a flow chart of a method for transferring network data, according to an embodiment of the present invention.

According to yet another aspect of the present invention, a method for transferring network data is disclosed. FIG. 3 illustrates a flow chart of a method 300 for transferring network data, according to an embodiment of the present invention. Now the detailed steps of the method 300 are described below with reference to FIG. 2 and FIG. 3. At step 301, general computation is executed to generate general computing data by a GPU 208 of the graphics card 200b. At step 302, a pointer to the general computing data is bound to a texture to generate texture data by the GPU 208. The general computing data and the texture are stored in a device memory 207 of the graphics card 200b. At step 303, the texture data is encoded to generate a data signal in a TMDS signal by a digital video sender 209 of the graphics card 200b. At step 304, the TMDS signal is output to a device 200a for transferring network data via a DVI 210 of the graphics card 200b by the digital video sender 209. At step 305, the data signal is converted to network data for being transferred via a network by a data processing module 201 of the device 200a. At step 306, the network data is received and transferred to an external device via the network by a network transmitter 202 of the device 200a.

The graphics card and the device involved in the above method for transferring network data have been described in the description about embodiments of the system for transferring network data. For brevity, a detailed description thereof is omitted. Those skilled in the art can understand that specific structure and operation mode thereof with reference to FIG. 1, FIG. 2 and FIG. 3 in combination with the above description.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A device for transferring network data, the device comprising:
   a data processing module configured to convert a data signal in a transition minimized differential signaling (TMDS) signal to network data; and
   a network transmitter for transferring the network data to an external device via the network,
   wherein the data signal is generated by encoding texture data generated by a graphics processing unit.

2. The device according to claim 1, wherein a network data transfer operation of the device is controlled by a control signal in the TMDS signal.

3. The device according to claim 1, wherein the device is powered at least partially by a power signal in the TMDS signal.

4. The device according to claim 3, further comprising a power interface, via which an external power source provides additional electric energy to the device.

5. The device according to claim 1, wherein the data processing module includes:
a digital video receiver configured to decode the data signal to parallel data; and
a data converter configured to convert the parallel data to the network data according to a communications protocol.

6. The device according to claim 1, wherein the network transmitter is a wired network transmitter for transferring the network data to the external device via a wired connection.

7. The device according to claim 1, wherein the network transmitter is a wireless network transmitter for transferring the network data to the external device wirelessly.

8. The device according to claim 1, wherein the network transmitter includes a wired network transmitter and a wireless network transmitter, and the data processing module is further configured to control the network data to be transferred to the external device via the wired network transmitter or the wireless network transmitter.

9. The device according to claim 1, wherein the data processing module includes an encryption module configured to encrypt the network data before the network data is received by the network transmitter.

10. The device according to claim 1, wherein the data processing module includes an extended display identification data memory for storing virtual display information, so that a graphics card reads the virtual display information via the digital video interface and determines a transfer parameter of the TMDS signal according to the virtual display information.

11. The device according to claim 1, wherein the texture data is generated by binding a pointer to general computing data stored in a device memory of a graphics card to a texture stored in the device memory by the graphics processing unit.

12. The device according to claim 11, wherein the general computing data is generated by general computation executed by the graphics processing unit.

13. A system for transferring network data, the system comprising:
one or more subsystems for transferring network data, each of which includes a graphics card and a device for transferring network data,
wherein the graphics card includes:
a graphics processing unit configured to generate general computing data; and
a digital video sender for encoding texture data to generate a data signal in a transition minimized differential signaling (TMDS) signal and outputting the TMDS signal to the device; and
wherein the device includes:
a data processing module configured to convert the data signal to network data for being transferred via a network; and
a network transmitter for transferring the network data to an external device via the network.

14. The system according to claim 13, wherein the TMDS signal includes a control signal to control a network data transfer operation of the device.

15. The system according to claim 13, wherein the TMDS signal includes a power signal, which is transferred to the device via a digital video interface for powering the device at least partially.

16. The system according to claim 15, wherein the device further includes a power interface, via which an external power source provides additional electric energy to the device.

17. The system according to claim 13, wherein the data processing module includes:
a digital video receiver configured to decode the data signal to parallel data; and
a data converter configured to convert the parallel data to the network data according to a communications protocol.

18. The system according to claim 13, wherein the network transmitter is a wired network transmitter for transferring the network data to the external device via a wired connection.

19. The system according to claim 13, wherein the network transmitter is a wireless network transmitter for transferring the network data to the external device wirelessly.

20. The system according to claim 13, wherein the network transmitter includes a wired network transmitter and a wireless network transmitter, and the data processing module is further configured to control the network data to be transferred to the external device via the wired network transmitter or the wireless network transmitter.

21. The system according to claim 13, wherein the data signal includes a vertical synchronizing signal to control processing speed of the graphics processing unit.

22. The system according to claim 13, wherein the graphics processing unit is further configured to bind a pointer to the general computing data to a texture to generate texture data.

23. The system according to claim 11, further comprising a device memory for storing the general computing data and a texture for generating the texture data.

24. A method for transferring network data, the method comprising:
executing general computation to generate general computing data;
binding a pointer to the general computing data to a texture to generate texture data;
converting a data signal that is based on the texture data to network data for being transferred to an external device; and
transferring the network data to the external device via the network.

25. The method according to claim 24, further comprising encoding the texture data to generate the data signal in a transition minimized differential signaling (TMDS) signal.

* * * * *